US008755743B2

(12) United States Patent
Patil

(10) Patent No.: US 8,755,743 B2
(45) Date of Patent: Jun. 17, 2014

(54) EARPIECE MESSAGING

(75) Inventor: Naganagouda B. Patil, Ashland, MA (US)

(73) Assignee: Bose Corporation, Framingham, MA (US)

( * ) Notice: Subject to any disclaimer, the term of this patent is extended or adjusted under 35 U.S.C. 154(b) by 183 days.

(21) Appl. No.: 13/194,368

(22) Filed: Jul. 29, 2011

(65) Prior Publication Data

US 2013/0029605 A1 Jan. 31, 2013

(51) Int. Cl.

| | |
|---|---|
| ***H04B 5/00*** | (2006.01) |
| ***H04M 1/00*** | (2006.01) |
| ***H04M 1/24*** | (2006.01) |

(52) U.S. Cl.

USPC ........................ 455/41.1; 455/575.2; 379/1.02

(58) Field of Classification Search

USPC ................ 455/41.1, 41.2, 41.3, 575.2, 575.7, 455/569.1, 550.1, 422.1; 348/77; 705/39; 446/369, 397; 345/727; 379/1.01, 1.02, 379/29.03, 29.04, 39, 142, 88.16–88.18, 379/88.9, 88.11–88.12, 88.07–88.08

See application file for complete search history.

(56) References Cited

U.S. PATENT DOCUMENTS

| | | | | |
|---|---|---|---|---|
| 2003/0058728 | A1* | 3/2003 | Tran et al. | 365/230.03 |
| 2003/0112266 | A1* | 6/2003 | Chang et al. | 345/727 |
| 2004/0033820 | A1* | 2/2004 | Lewis | 455/569.1 |
| 2005/0138617 | A1* | 6/2005 | Friedman | 717/174 |
| 2006/0166718 | A1* | 7/2006 | Seshadri et al. | 455/575.2 |
| 2007/0093279 | A1* | 4/2007 | Janik | 455/569.1 |
| 2008/0063156 | A1* | 3/2008 | Grohn et al. | 379/88.16 |
| 2008/0254787 | A1* | 10/2008 | Tsao et al. | 455/422.1 |
| 2008/0311853 | A1* | 12/2008 | Tamura | 455/41.3 |
| 2011/0028067 | A1* | 2/2011 | Forks et al. | 446/369 |
| 2011/0063429 | A1* | 3/2011 | Contolini et al. | 348/77 |
| 2011/0184853 | A1* | 7/2011 | Mark et al. | 705/39 |
| 2011/0231661 | A1* | 9/2011 | Ramakrishnan et al. | 713/171 |

* cited by examiner

*Primary Examiner* — Andrew Wendell
*Assistant Examiner* — Cindy Trandai

(57) ABSTRACT

An earpiece designed to be wirelessly connected to an associated electronic device. The earpiece detects loss of connectivity with the associated electronic device and restoration of connectivity with the electronic device. The earpiece may disable and re-enable communications with the electronic device and/or audibly output a message to a user depending on the detected loss of connectivity or restoration of connectivity.

6 Claims, 3 Drawing Sheets

EARPIECE MESSAGING

BACKGROUND

This specification describes a wireless earpiece that is designed to be wirelessly connected with an associated electronic device.

SUMMARY

In one aspect, an earpiece includes circuitry for wirelessly receiving audio signals from an electronic device; circuitry for transducing the received audio signals into sound waves corresponding to the received audio signals; structure for conducting the sound waves corresponding to the received audio signals directly to the ear canal of a user; a microphone; circuitry for transducing sound waves corresponding to verbal messages spoken by a user to audio signals corresponding to the verbal messages; circuitry for storing the audio signals corresponding to the verbal messages; and circuitry for transducing the audio signals corresponding to the verbal messages to sound waves corresponding to the verbal messages. The earpiece may further include circuitry for monitoring operating conditions of the earpiece and for selecting, responsive to the monitored operating conditions, one of the messages.

In another aspect, a method, includes detecting a loss of connectivity between a wireless earpiece and a paired device and responsive to the detecting the loss of connectivity, disabling the wireless earpiece. The method may further include detecting the presence of the paired device within transmission range of the earpiece; and re-enabling the wireless earpiece. The method may further include retrieving, by a microprocessor within the earpiece, a program from a memory within the earpiece; and executing, by the microprocessor, the program. The method may further include audibly outputting, by the earpiece, a message that informs a listener wearing the earpiece, that that the earpiece may be disabled. The method may further include prompting, by the earpiece, a user to speak the message; transducing, by the earpiece, the message to audio signals; and storing, by the earpiece, the audio signals.

In another aspect, an apparatus includes an earpiece includes circuitry for detecting a loss of connectivity between an earpiece and a paired device and circuitry, responsive to the detecting circuitry, for disabling the earpiece. The apparatus may further include circuitry for detecting the presence of the paired device in an operating range of a transceiver of the wireless earpiece; and circuitry, responsive to the detecting circuitry, for re-enabling the earpiece. The apparatus may further include a memory in the earpiece, for storing, a program for re-enabling the earpiece and a microprocessor, within the earpiece, for executing the program. The apparatus of claim may further includes circuitry for prompting a user to speak a message; a microphone, for transducing the spoken message to audio signals; and a memory in the earpiece, for storing the audio signals.

Other features, objects, and advantages will become apparent from the following detailed description, when read in connection with the following drawing, in which:

DETAILED DESCRIPTION

Figure 1A:
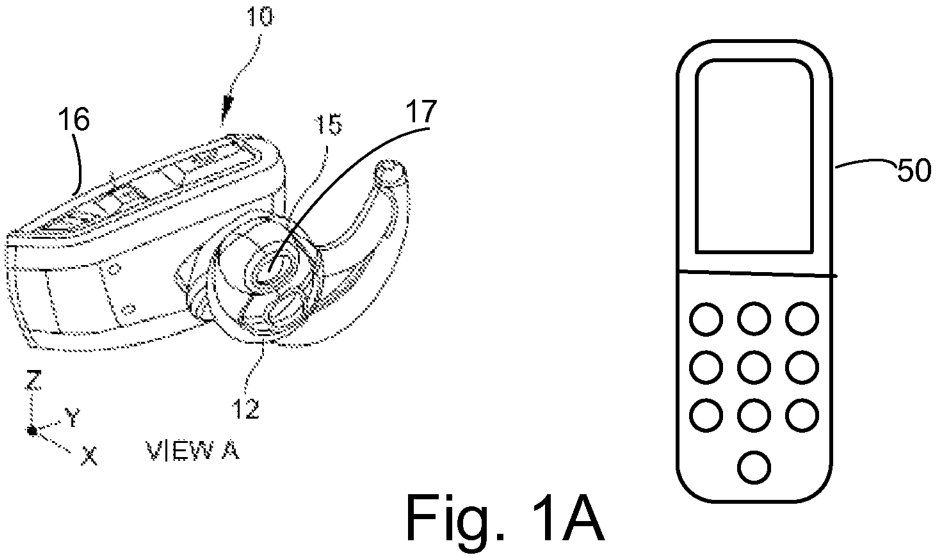
FIG. 1A is a partially isometric partially diagrammatic view of a wireless earpiece 10 and an associated electronic device.

Though the elements of several views of the drawing may be shown and described as discrete elements in a block diagram and may be referred to as "circuitry", unless otherwise indicated, the elements may be implemented as one of, or a combination of, analog circuitry, digital circuitry, or one or more microprocessors executing software instructions. The software instructions may include digital signal processing (DSP) instructions. Operations may be performed by analog circuitry or by a microprocessor executing software that performs the mathematical or logical equivalent to the analog operation. Unless otherwise indicated, signal lines may be implemented as discrete analog or digital signal lines, as a single discrete digital signal line with appropriate signal processing to process separate streams of audio signals, or as elements of a wireless communication system. Some of the processes may be described in block diagrams. The activities that are performed in each block may be performed by one element or by a plurality of elements, and may be separated in time. The elements that perform the activities of a block may be physically separated. Unless otherwise indicated, audio signals or video signals or both may be encoded and transmitted in either digital or analog form; conventional digital-to-analog or analog-to-digital converters may not be shown in the figures.

FIG. 1A shows a partially isometric, partially diagrammatic view of a wireless earpiece 10 and an associated electronic device 50, such as a device including a cellular telephone. The earpiece 10 includes an acoustic driver 12 and an in-ear portion 15 with a passageway 17 that permits sound waves radiated by the acoustic driver to be conducted directly to the ear canal of a user. The earpiece may include an electronics module 16 that may be designed to be outside the ear when the earpiece is in position.

Figure 1B:
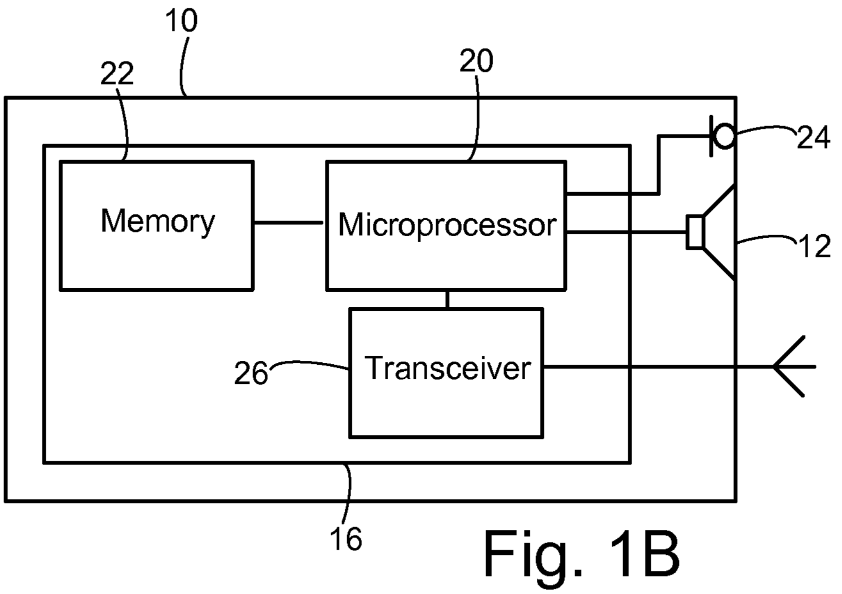
FIG. 1B is a block diagram of the logical arrangement of the earpiece.

FIG. 1B shows a logical arrangement of the earpiece 10. The electronics module 16 includes a microprocessor 20, a memory 22, a microphone 24 and a wireless transceiver 26. The memory 22 permits the storage of audio signals, and microphone 24 permits the recording of audio messages that can be reproduced by the acoustic driver 12. The recording of audio messages will be discussed further below.

Prior to operating, the earpiece 10 and the electronic device 50 must be paired. The earpiece is put in pairing (sometimes referred to as "discovering") mode by the user. The device to which the earpiece is to be paired identifies itself to the user. The earpiece may be paired with more than one device, but in at least some embodiments, at any one time, only one device can send information to, or receive information from, the earpiece. Hereinafter, this one device will be referred to as the "base device", and if the base device is within the range of the transceiver 26 of the earpiece, it will be referred to as "connected" to the earpiece. If an earpiece is paired with multiple devices, the base device may be determined by an algorithm (for example, the last device that has interacted with the earpiece), or may be decided by a hierarchy, or the earpiece may provide some way of selecting a device to which is it connected.

Figure 2:
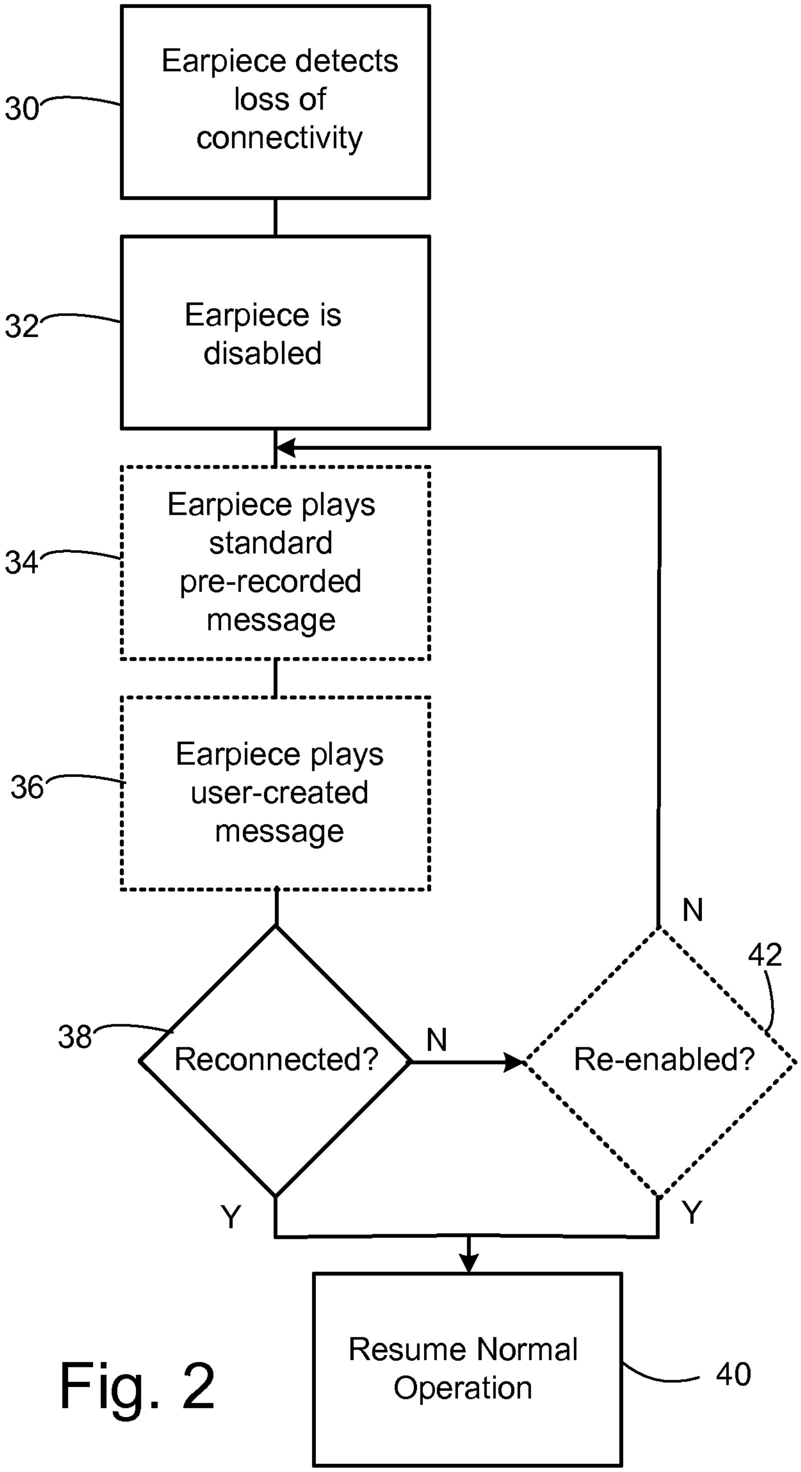
FIGS. 2-5 are block diagrams of processes used with the wireless earpiece.

FIG. 2 shows a process which the earpiece may follow when a connected device is loses connectivity, for example, by being physically moved out of the range of operation of the transceiver 26 of FIG. 1B. At block 30, the earpiece detects the loss of connectivity. This may be done, for example, by transmitting a message to the device that requests a reply. If the reply is not received, the earpiece may determine that the device is no longer connected. In some implementations, the earpiece may then search of other previously paired devices. Following block 30, the earpiece is disabled at block 32, so that it cannot send or receive information, except as needed to carry out the activities in the following blocks. In addition, the activities of one or both of blocks 34 and 36 may occur. In block 34, the earpiece audibly outputs a standard pre-recorded message using acoustic driver 12 of FIG. 1B. Examples of a standard, pre-recorded messages might be "Connection lost" or "This earpiece is disabled". In block 36, the earpiece audibly outputs a user created message by acoustic driver 12 of FIG. 1B. Examples of user-created messages might be "This earpiece belongs to Joe Smith" or "Please return this earpiece to XYZ corporation." The creation of user-created messages will be discussed later. At step 38, it is determined if the earpiece is reconnected with the base device. If reconnection has occurred, the earpiece resumes normal operation at block 40. In addition, it may be determined if the earpiece has been re-enabled at block 42. If the earpiece has been re-enabled, the earpiece resumes normal operation at block 40. If the earpiece has not been re-enabled, the actions of one or both of blocks 34 and 36 may be repeated The actions of blocks 34, 36, 38, and 42 may be repeated at intervals. The intervals may be variable. For example, when the earpiece first detects loss of connectivity, the interval may be relatively short, for example one minute. When the earpiece has been disconnected for several hours, the interval might be longer, for example several minutes.

The determining if the earpiece is reconnected with the base device at block 38 may be done in a manner similar to the detection of loss of connectivity at block 30. If the earpiece transmits a message to the device that requests a reply, the earpiece may determine that the device is reconnected.

The re-enablement, queried for in block 42, may be done automatically. In addition, or alternatively, the earpiece may be re-enabled at block 42 in some other manner. For example, an earpiece manufacturer may establish a registration system that permits identification of authorized users, with the capability of re-enabling the earpiece remotely. Or a program operable by microprocessor 20 of FIG. 1B may provide some sort of verification and re-enabling procedure. The re-enablement may be repeated for other previously paired devices.

Figure 3:
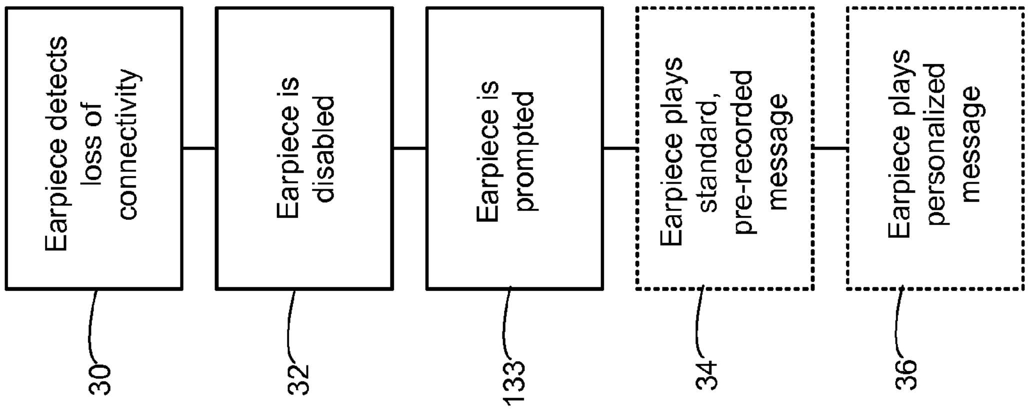

FIG. 3 shows a process that may be used in place of, or in conjunction with, the process of FIG. 2. In the process of FIG. 3, at block 30, the earpiece detects the loss of connectivity. At block 32, the earpiece is disabled, so that it cannot send or receive information, except as needed to carry out the activities in the following blocks. If the earpiece is prompted, at block 133, the earpiece audibly outputs one or both of a standard, pre-recorded message at block 34, or a user-created message at block 36, similar to the message in the like numbered blocks of FIG. 2. The process of FIG. 3 may be useful if it is not desired to replay the message, or if the interval between repetitions of the messages is relatively long, for example several minutes.

Figure 4:
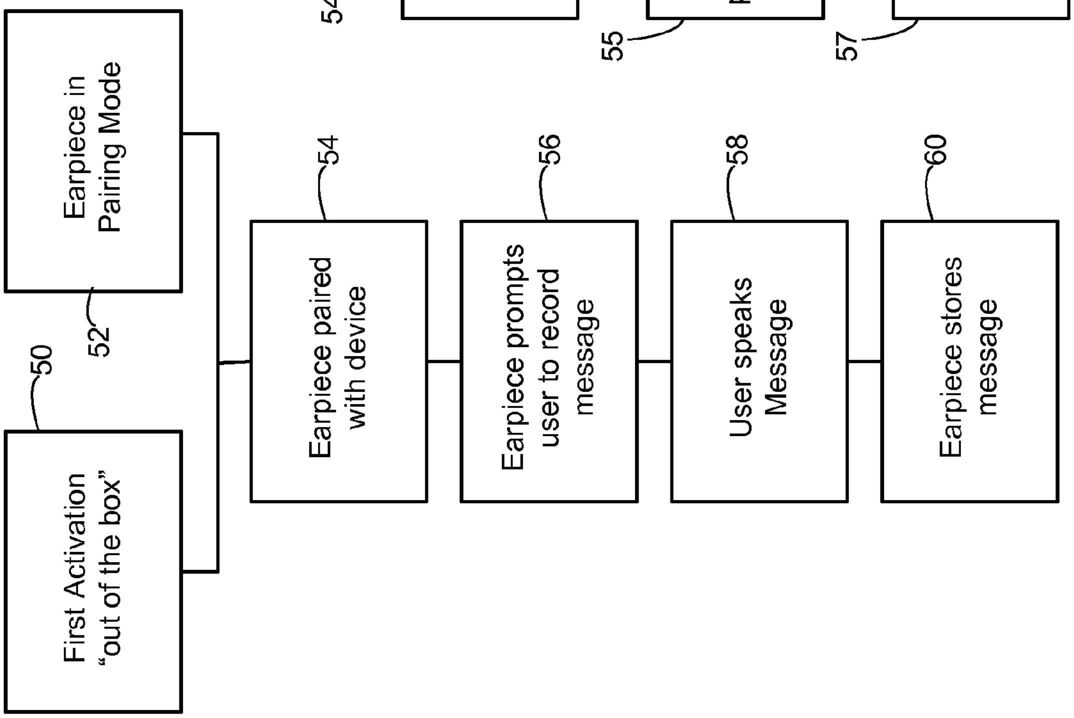

FIG. 4 shows a process for creating a user-created message that may be used at blocks 36 of FIG. 2. If the earpiece is put in pairing mode, which may occur automatically at block 50 the first time the earpiece is activated out of the box, or which may occur when a user places the earpiece in pairing mode at block 52, the earpiece is paired with the device at block 54, and at block 56, the earpiece visibly or audibly prompts the user to record the personalized message that the user wants to use with that device. At step 58, the user speaks the message.

The spoken message is transduced by microphone 24 to audio signals and the audio signals are stored in memory 22 of FIG. 1B.

An earpiece according to FIGS. 1A-4 is advantageous over conventional earpieces because disabling the earpiece deters theft and unauthorized use of earpieces, and if and earpiece is lost and later found, an earpiece according to FIGS. 1A-4 can assist the finder in returning the earpiece to the owner, making it more likely that the finder will return the lost earpiece to the user. Additionally, the earpiece can clearly communicate information to the user or anyone else that finds it that is not clearly communicatable by more ambiguous methods, for example, blinking lights or "beeps". The user does not need to memorize the meaning of blinking light patterns or beep patterns or refer to a user manual to determine the information being communicated by the earpiece. A wide variety of different messages can be communicated without the need for complicated "coding" systems (i.e. multiple blinking light patterns, multiple blinking lights, multiple different "beeps"). Significant amounts of information can be communicated without an expensive and space consuming video display. Providing the additional capabilities can be done without the addition of any additional components.

Figure 5:
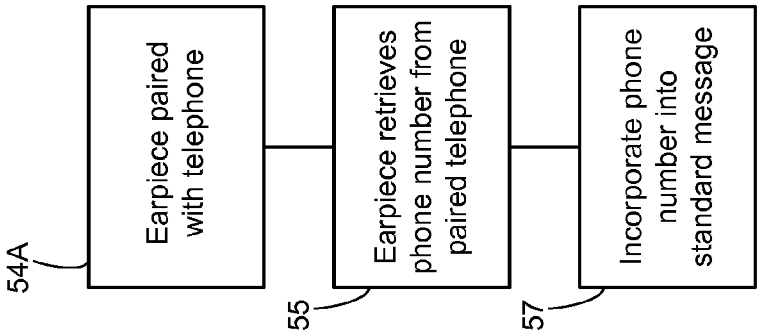

FIG. 5 shows a process that can be used with the process of FIG. 4 if the paired device includes a telephone and if the telephone is capable of providing the telephone number to the earpiece. At block 54A, the earpiece is paired with a telephone. At block 55, the earpiece retrieves the phone number from the paired telephone. At block 57, the earphone incorporates the phone number into the standard, pre-recorded message or into the message created by the user according to FIG. 4. For example, the standard pre-recorded message might be, "Please call 123-456-7890 and arrange to return this earpiece to the owner."

Numerous uses of and departures from the specific apparatus and techniques disclosed herein may be made without departing from the inventive concepts. Consequently, the invention is to be construed as embracing each and every novel feature and novel combination of features disclosed herein and limited only by the spirit and scope of the appended claims.

What is claimed is:

1. An earpiece comprising:

circuitry for wirelessly receiving audio signals from an electronic device;

circuitry for transducing the received audio signals into sound waves corresponding to the received audio signals;

structure for conducting the sound waves corresponding to the received audio signals directly to the ear of a user;

a microphone;

circuitry for transducing sound waves corresponding to verbal messages spoken by a user to audio signals corresponding to the verbal messages;

circuitry for storing the audio signals corresponding to the verbal messages;

circuitry for transducing the audio signals corresponding to the verbal messages to sound waves corresponding to the verbal messages; and circuitry for monitoring operating conditions of the earpiece and for selecting, responsive to the monitored operating conditions, one of the verbal messages, wherein the circuitry for monitoring the operating conditions of the earpiece;

selects one of the verbal messages identifying an owner of the earpiece in response to the monitored operating conditions indicating a loss of connectivity between the earpiece and the electronic device, and activates the circuitry for transducing the audio signals using the selected verbal message.

2. The earpiece of claim 1, further comprising:

circuitry for detecting a loss of connectivity between the earpiece and the electronic device; and circuitry, responsive to the detecting circuitry, for disabling the earpiece.

3. The earpiece of claim 2, further comprising:

circuitry for detecting the presence of the electronic device in an operating range of a transceiver of the earpiece; and circuitry, responsive to the detecting circuitry, for re enabling the earpiece.

4. The earpiece of claim 2, further comprising:

a memory in the earpiece, for storing, a program for re enabling the earpiece and;

a microprocessor, within the earpiece, for executing the program.

5. The earpiece of claim 2, further comprising:

circuitry for prompting a user to speak a message.

6. An earpiece comprising:

circuitry for wirelessly receiving audio signals from an electronic device;

circuitry for transducing the received audio signals into sound waves corresponding to the received audio signals;

structure for conducting the sound waves corresponding to the received audio signals directly to the ear of a user;

a microphone;

circuitry for transducing sound waves corresponding to verbal messages spoken by a user to audio signals corresponding to the verbal messages;

circuitry for storing the audio signals corresponding to the verbal messages;

circuitry for transducing the audio signals corresponding to the verbal messages to sound waves corresponding to the verbal messages;

circuitry for retrieving a telephone number from the electronic device;

circuitry for incorporating the telephone number into one of the verbal messages; and circuitry for monitoring operating conditions of the earpiece that:

selects the verbal message incorporating the telephone number in response to the monitored operating conditions indicating a loss of connectivity between the earpiece and the electronic device, and activates the circuitry for transducing the audio signals using the selected verbal message.

* * * * *